United States Patent [19]

Madsen

[11] Patent Number: 4,840,841

[45] Date of Patent: Jun. 20, 1989

[54] DISPOSABLE ONE-PIECE SEAT LINER

[76] Inventor: John J. Madsen, 138 S. 35th St., Belleville, Ill. 62223

[21] Appl. No.: 168,488

[22] Filed: Mar. 15, 1988

[51] Int. Cl.$^4$ ................. B32B 27/00; A61F 13/16
[52] U.S. Cl. ........................... 428/286; 428/137; 428/156; 428/171; 428/280; 428/282; 428/284; 428/285; 428/288; 428/297; 428/326; 428/913; 297/219; 297/229; 5/483; 5/484; 5/487; 604/367; 604/368; 604/379; 604/381; 604/385.1; 604/393
[58] Field of Search ................ 428/80, 280, 137, 282, 428/138, 284, 218, 285, 36, 286, 288, 297, 298, 903, 192, 326, 920, 913, 156, 171, 172; D6/611, 333; 297/219, 229, DIG. 5; 5/483, 484, 487; 604/367, 368, 379, 381, 385.1, 393

[56] References Cited

U.S. PATENT DOCUMENTS

| | | | |
|---|---|---|---|
| D. 257,084 | 9/1910 | Fuller et al. | D6/611 |
| D. 275,634 | 9/1984 | Schutz | D6/333 |
| D. 294,889 | 3/1988 | Nakao et al. | D6/333 |
| 4,621,004 | 11/1986 | Madsen | 428/80 |

Primary Examiner—Thurman K. Page
Assistant Examiner—P. J. Ryan
Attorney, Agent, or Firm—Grace J. Fishel

[57] ABSTRACT

A disposable one-piece seat liner formed from a uniform layer of absorbant cellulosic fibers possessing sufficient integrity than it does not abrade during normal use bonded to a flexible moisture repellant backing sheet. The seat liner is designed for use on seals having a bottom, back, sidewalls and arms and has an upper and lower section with the upper section sized to cover the back of the seat with the side edges folding forward and the lower section sized to cover the bottom of the seat with the side edges folding upward along the arms of the seat joined by a fold line at the junction between the upper and lower sections. A plurality of slots are provided to accommodate the seat belts of a wide range of different care seats, strollers, carriers, highchairs and the like having attachment means passing between the legs of a person seated in the seat, coming over the shoulders or around the waist from the midpoint of the back of from the sides. Dual sides tape or the like is provided around the periphery of the liner for attaching the liner to the seat.

14 Claims, 2 Drawing Sheets

DISPOSABLE ONE-PIECE SEAT LINER

BACKGROUND OF THE INVENTION

The present invention relates to a disposable one-piece seat liner including means to accommodate the seat belts of a wide variety of car seats, strollers, carriers, highchairs and the like. The seat liner is formed from a layer of absorbent cellulosic fibers or the like possessing sufficient integrity that it does not abrade during normal use bonded to a flexible moisture repellant backing sheet. One advantage of the present invention over prior art disposable seat liners such as that described in U.S. Pat. No. 4,621,004 is that it can be manufactured much more efficiently.

SUMMARY OF THE INVENTION

It is an object of the present invention to provide a disposable one-piece seat liner for use in a variety of seats.

Another object is to provide a seat liner which can be manufactured very efficiently from a uniform layer of absorbent cellulosic fibers bonded to a flexible moisture repellant sheet.

Still yet another object is to provide a seat liner formed from a layer of cellulosic fibers possessing sufficient integrity that it does not abrade during normal use or require a facing sheet.

Other objects and features of the present invention will be in part apparent and in part pointed out hereinafter.

The invention accordingly comprises a one-piece disposable seat liner formed from a uniform layer of absorbent cellulosic fibers possessing sufficient integrity that it does not abrade during normal use bonded to a flexible moisture repellant sheet. The liner includes a plurality of slots to accommodate the seat belts of a wide range of different car seats, strollers, carriers, highchairs and the like having attachment means passing between the legs of a person seated in the seat, coming over the shoulders or around the waist from the midpoint of the back or from the sides.

BRIEF DESCRIPTION OF THE DRAWINGS

In the accompanying drawings in which one of various possible embodiments of the invention is illustrated, corresponding reference numerals refer to corresponding parts and in which.

DESCRIPTION OF THE PREFERRED EMBODIMENTS

Figure 3:
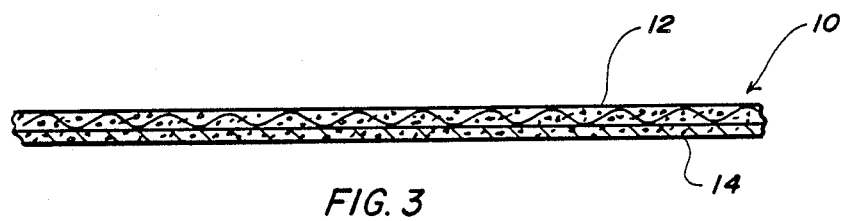

Referring to the drawings more particularly by reference character, reference numeral 10 refers to a disposable one-piece seat liner in accordance with the present invention. As shown in FIG. 3, seat liner 10 is formed from a uniform layer of cellulosic or similar fibers 12 bonded to a moisture repellant backing sheet 14 such as a thin flexible film of polyethylene, polyurethane or the like. Using technology developed for the manufacture of burn dressings, cellulosic fibers 12 are preferably permeated with acrylic or the like so that the absorbent layer possesses sufficient integrity that it does not abrade during normal use thus obviating the need for a facing sheet. Bonding is accomplished with glue or heat or by extruding backing 14 directly onto layer of fibrous material 12.

Figure 1:
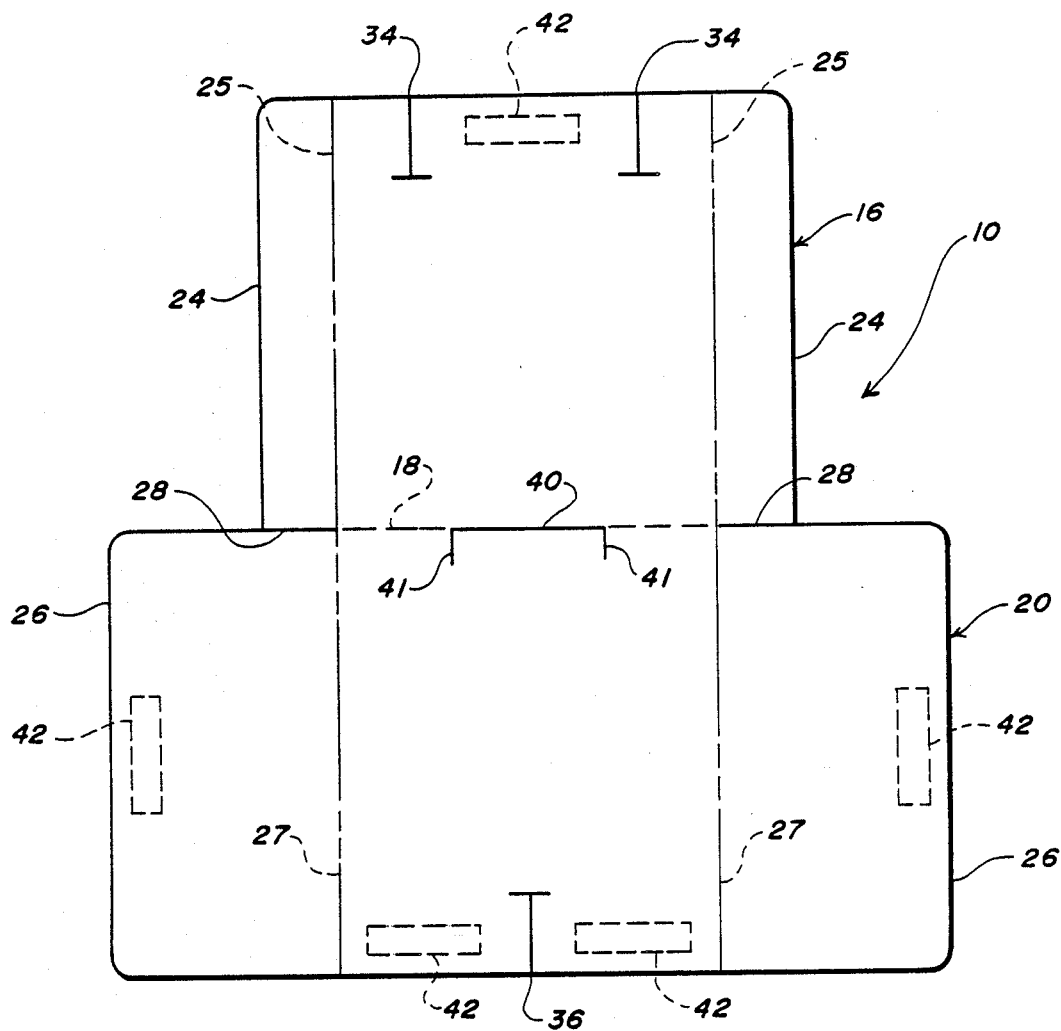
FIG. 1 is a plan view of a disposable one-piece seat liner in accordance with the present invention.
Figure 2:
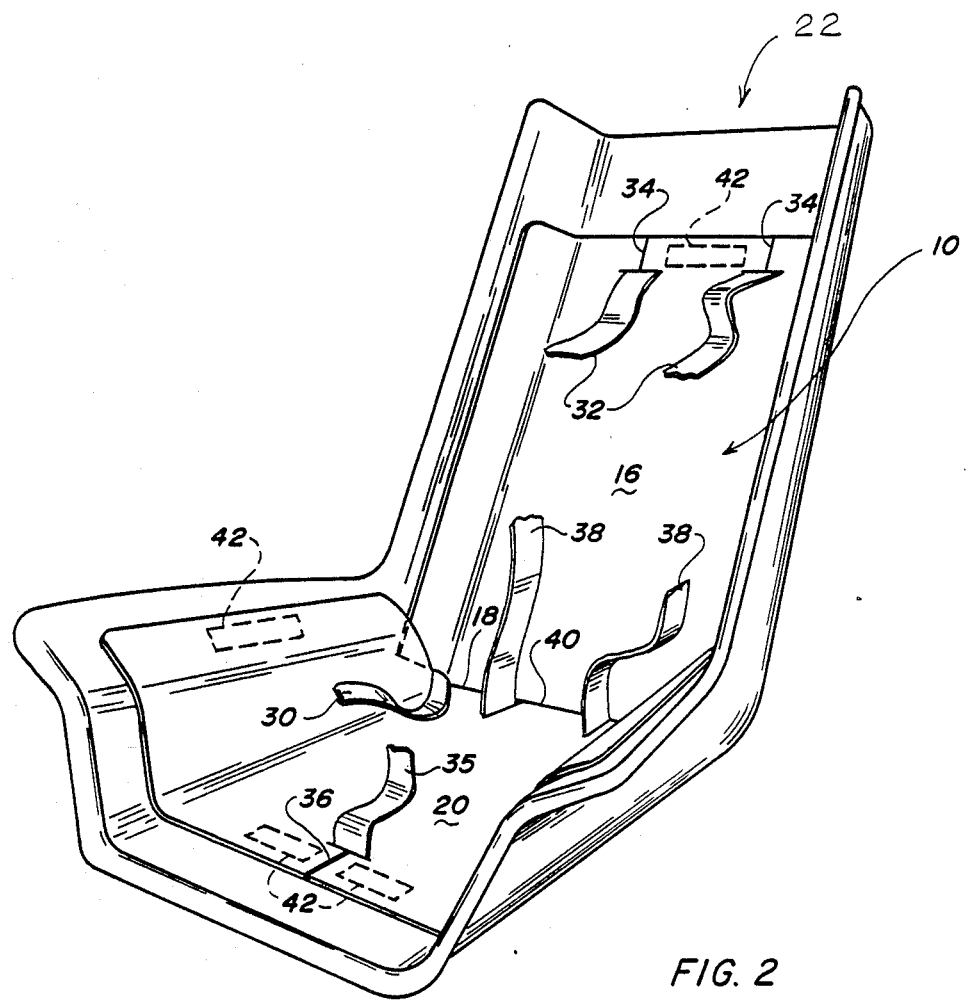
FIG. 2 is a perspective view of the seat liner in use in a set having a bottom, back, sidewalls and arms; and, FIG. 3 is a cross sectional view of the material making up the liner.

Seat liner 10 includes an upper section 16 joined at a fold line 18 to a lower section 20. As shown in FIG. 1, sections 16 and 20 are generally rectangular and as shown in FIG. 2 are dimensioned such that upper section 16 is wide and long enough to cover the back of a seat 22 having a bottom, back, sidewalls and arms with the side edges 14 folding forward along a fold line 25 to form flaps to protect the sidewalls of the seat and lower section 20 is wide and long enough to cover the bottom of seat 22 with the side edges 26 folding upward along a fold line 27 to form flaps to protect the arms of seat 22. It is preferred that lower section 20 be wider than upper section 16 such that flaps 26 are wider than flaps 24 as most seats are deeper at the arms than at the sidewalls and, in any event, protection is more likely needed on the arms.

A pair of opposing slots 28 are provided at opposite ends of fold line 18. These slots permit side edges 24 and 26 to independently fold forwardly and upwardly, respectively, which operation would be difficult without the relief of slots 28. If seat 22 has lap belts 30 attached to the seat along the side edges of the seat, slots 28 can be used to bring the ends of lap belts 30 through liner 10.

For use with seats 22 having a pair of shoulder belts 32 attached to the back of the seat and passing over a seated person's shoulders, liner 10 includes a pair of slots 34 spaced about the midline of the liner and starting at an outer edge of upper section 16. Slots 34 are preferably T-shaped and parallel to the midline of seat liner 10. The mating portion 35 of shoulder belts 32 is typically accessed between the legs of a person occupying the seat, for which purposes a slot 36, preferably T-shaped, is provided in lower section 16 on the midline of the liner starting at an outer edge. To accommodate other seats which have lap belts 38 which are attached to the middle of the back of seat 22, a slot 40 is provided in fold line 18 such that the ends of belts 38 can be passed though line 10. As shown in FIG. 1, slot 40 is preferably U-shaped with the free ends 41 of the slot facing T-shaped slot 36 in lower section 16.

A plurality of detachable bonding means 42 are provided about the periphery of liner 10 to prevent displacement of the liner during use. For example, a strip of dual-sided tape, Velcro or the like may be provided between slots 34 in upper section 16, on flaps 26 protecting the arms of the seat and on opposite sides of slot 36 between the occupant's legs.

In use, liner 10 is brought into contact with seat 22 at the junction between the bottom and the back of the seat using lap belts 30 or 38 to orient the liner. Liner 10 may be adjusted up or down on seat 22 as necessary to permit lap belts 30 or 38 to be brought through the liner. This will effect fold line 18 at the junction between the bottom and back of the seat by as much as several inches in some cases. If no lap belts 30 or 38 are present, shoulder belts 32 and slot 36 between the occupant's legs are used to orient the liner to the seat. Once the belts have been brought through the liner, the liner is then smoothed across the back and bottom of seat 22 with side edges 24 folded forward and side edges 26 folded upward forming a pocket within which a person can be seated. Detachable bonding means 42 are then uncovered and liner 10 detachably bonded to seat 22.

Seat liner 10 may be manufactured in a continuous operation wherein uniform cellulosic layer 12 is bonded to moisture repellant backing sheet 14, the liner and slots cut in a single die, laser or the like cutting operation and bonding means 42 applied. Liners 10 are then packaged for distribution to the consumer at a far lower manufacturing cost than is possible with the above-mentioned prior art disposable liners for reasons which will be readily apparent to those skilled in the art.

In view of the above, it will be seen that the several objects of the invention are achieved and other advantageous results attained. As various changes could be made in the above constructions without departing from the scope of the invention, it is intended that all matter contained in the above description or shown in the accompanying drawing shall be interpreted as illustrative and not in a limiting sense.

What is claimed:

1. A one-piece disposable seat liner for seats having a bottom, back, sidewalls and arms formed from a uniform layer of absorbent cellulosic fibers possessing sufficient integrity that it does not abrade during normal use bonded to a flexible moisture repellant backing sheet, said seat liner comprising a pocket formed from an upper and a lower section with the upper section sized to cover the back of the seat with the side edges folding forward along the sidewalls of the seat and the lower section sized to cover the bottom of the seat with the side edges folding upward along the arms of the seat joined by a fold line at the junction between the upper and lower sections.

2. The seat liner of claim 1 having a slot provided at the midline of the lower section to access the seat between the legs of a person seated therein.

3. The seat liner of claim 2 having a pair of slots spaced generally equidistant from the midline of the upper section to access a pair of straps passing over the shoulders of a person seated therein.

4. The seat liner of claim 3 having a slot generally centered at the midline of the liner in the fold line between the upper and lower sections to access a pair of lap belts coming from the back of the seat.

5. The seat liner of claim 4 having a pair of opposing slots at opposite outer edges in the fold line between the upper and lower sections to facilitate folding the side edges of the upper and lower sections and to access a pair of lap belts coming from the sides of the seat.

6. The seat liner of claim 5 having a plurality of attachment means about the periphery of the liner to prevent displacement of the liner during use.

7. A one-piece disposable seat liner for seats having a bottom, back, sidewalls and arms adapted for use in a variety of seats, said seat liner comprising an upper section and a lower section with the upper section sized to cover the back of the seat with the side edges folding forward along the sidewalls of the seat and the lower section sized to cover the bottom of the seat with the side edges folding upward along the arms of the seat joined by a fold line at junction between the upper and lower sections, a slot is provided at the midline of the lower section to access the seat between the legs of a person seated therein, a pair of slots are provided spaced generally equidistant from the midline of the upper section to access a pair of straps passing over the shoulders of a person seated therein, a slot generally centered at the midline is provided at the fold line between the upper and lower sections to access a pair of lap belts coming from the back of the seat and a pair or slots are provided on the fold line starting at an outer edge to facilitate folding the side edges of the upper and lower sections and to access a pair of lap belts coming from the sides of the seat and wherein the liner is formed from a uniform layer of absorbent cellulosic fibers possessing sufficient integrity that it does not abrade during normal use bonded to a flexible moisture repellant backing sheet.

8. The seat liner of claim 7 wherein the cellulosic fibers are permeated with acrylic.

9. The seat liner of claim 8 having a plurality of attachent means about the periphery of the liner to prevent displacement of the liner during use.

10. A one-piece disposable seat liner for seats having a bottom, back, sidewalls and arms adapted for use in a variety of seats, said seat liner formed from a uniform layer of absorbent cellulosic fibers possessing sufficient integrity that it does not abrade during normal use bonded to a flexible moisture repellant backing sheet and comprising a narrow upper section and a wider lower section with the upper section sized to cover the back of a range of seats with the side edges folding forward along the sidewalls of the seat and the lower section sized to cover the bottom of a range of seats with the side edges folding upward along the arms of the seat joined by a fold line at the junction between the upper and lower sections, a T-shaped slot is provided at the midline starting at an outer edge of the lower section to access the seat between the legs of a person seated therein, a pair of T-shaped slots are provided spaced generally equidistant from the midline starting at an outer edge of the upper section to access a pair of straps passing over shoulders of a person seated therein, a U-shaped slot generally centered at the midline is provided at the fold line to access a pair of lap belts coming from the back of the seat and a pair of opposing slots are provided on the fold line starting at opposite side edges to facilitate folding the side edges of the upper and lower sections and to access a pair of lap belts coming from the sides of the seat.

11. The seat liner of claim 10 wherein the upper and lower sections are generally rectangular.

12. The seat liner of claim 11 wherein the T-shaped slots in the upper section are parallel to the midline of the seat liner.

13. The seat liner of claim 12 wherein the free ends of the U-shaped slot face towards the T-shaped slot in the lower section.

14. The seat liner of claim 13 having a plurality of attachment means about the periphery of the liner to prevent displacement of the liner during use.

* * * * *